US011321738B2

(12) United States Patent
Hadano et al.

(10) Patent No.: US 11,321,738 B2
(45) Date of Patent: May 3, 2022

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Hiroyasu Hadano, Toyota (JP); Yusuke Kaneko, Toyota (JP); Jun Goto, Toyota (JP); Hiroko Tsujimura, Gifu (JP); Miho Otsuka, Nagoya (JP); Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/572,044

(22) Filed: Sep. 16, 2019

(65) Prior Publication Data

US 2020/0090222 A1    Mar. 19, 2020

(30) Foreign Application Priority Data

Sep. 19, 2018   (JP) .............................. JP2018-174880

(51) Int. Cl.
*G06Q 30/02*   (2012.01)
(52) U.S. Cl.
CPC ..... *G06Q 30/0257* (2013.01); *G06Q 30/0265* (2013.01)
(58) Field of Classification Search
CPC .. G06Q 30/0271; G06Q 30/02; G06Q 10/087; G01C 21/3697; G01C 21/3492; G08G 1/09626; G06F 16/951; H04L 67/28

USPC ................................ 705/14.27, 17
See application file for complete search history.

(56) References Cited

U.S. PATENT DOCUMENTS

| | | | |
|---|---|---|---|
| 2004/0181466 A1 | 9/2004 | Ishida et al. | |
| 2005/0043994 A1* | 2/2005 | Walker | G06Q 10/087 705/14.19 |
| 2007/0214040 A1* | 9/2007 | Patel | G06Q 30/0259 705/14.17 |
| 2008/0098420 A1* | 4/2008 | Khivesara | G06Q 30/02 725/32 |
| 2009/0204580 A1* | 8/2009 | Seamon | G06F 16/951 |
| 2011/0270680 A1* | 11/2011 | Lim | H04L 67/28 705/14.58 |
| 2015/0112585 A1* | 4/2015 | Knepper | G01C 21/3697 701/410 |
| 2015/0176997 A1* | 6/2015 | Pursche | G01C 21/3492 340/905 |
| 2015/0271532 A1 | 9/2015 | Igarashi | |

(Continued)

FOREIGN PATENT DOCUMENTS

| | | |
|---|---|---|
| JP | 2003-006507 A | 1/2003 |
| JP | 2003-084699 A | 3/2003 |

(Continued)

*Primary Examiner* — Saba Dagnew
(74) *Attorney, Agent, or Firm* — Oliff PLC

(57) ABSTRACT

An information processing apparatus is provided with a controller including at least one processor. The controller is configured to execute obtaining a consent to advertisement viewing from a user using a transportation system, presenting an advertisement within a period of time during which the user is using the transportation system, and providing a monetary merit to the user.

6 Claims, 5 Drawing Sheets

(56) References Cited

U.S. PATENT DOCUMENTS

| | | | |
|---|---|---|---|
| 2015/0324863 A1* | 11/2015 | Pugh | G06Q 30/0226 705/14.27 |
| 2017/0188201 A1* | 6/2017 | Cansino | G08G 1/09626 |
| 2019/0272564 A1* | 9/2019 | Aktolun | G06Q 30/0271 |

FOREIGN PATENT DOCUMENTS

| | | |
|---|---|---|
| JP | 2004-287300 A | 10/2004 |
| JP | 2005-222481 A | 8/2005 |
| JP | 2012-088871 A | 5/2012 |
| JP | 2015-184710 A | 10/2015 |

* cited by examiner

[Fig. 1]
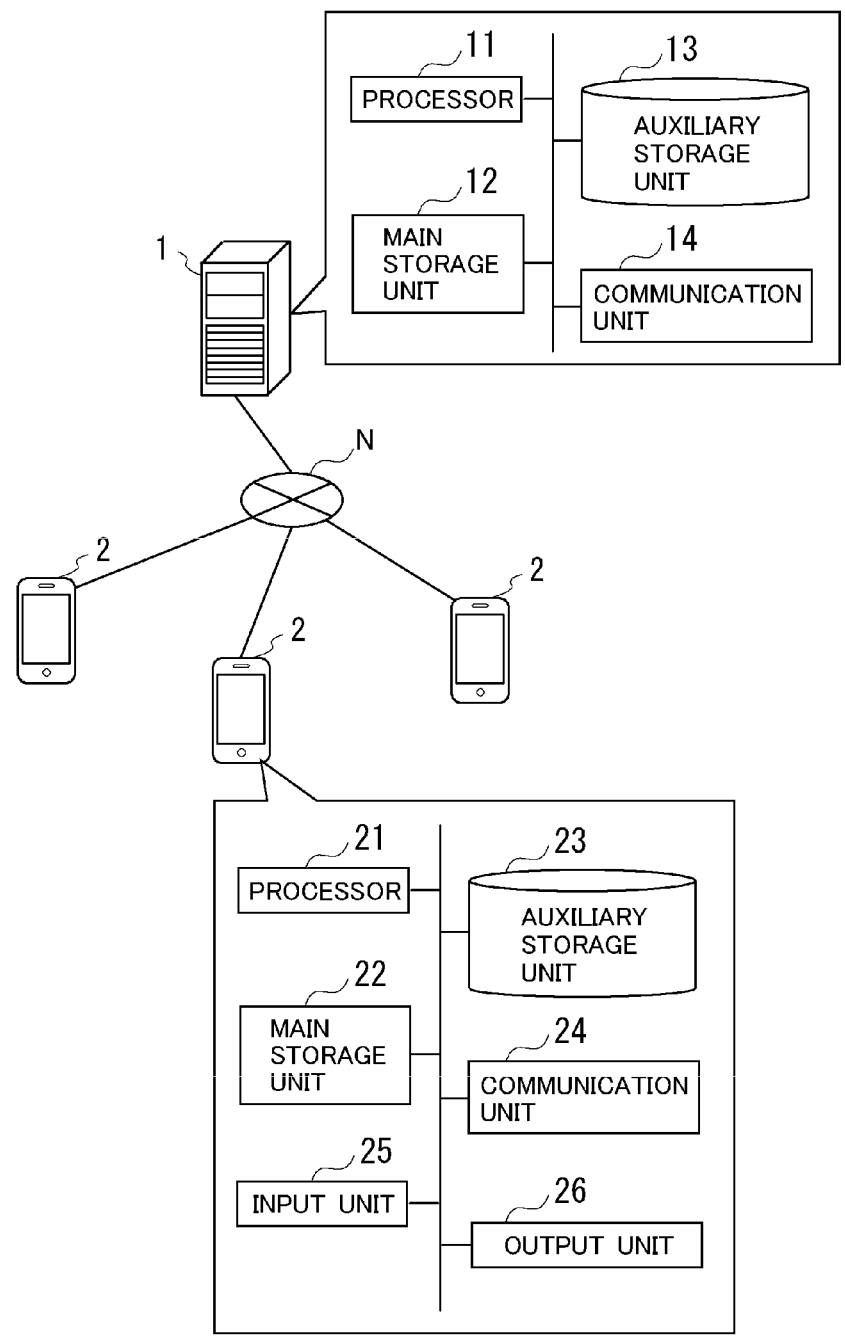

[Fig. 2]
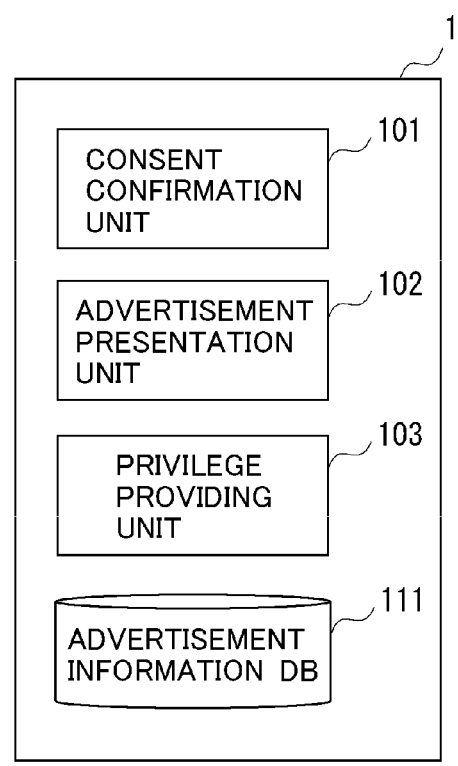

[Fig. 3]
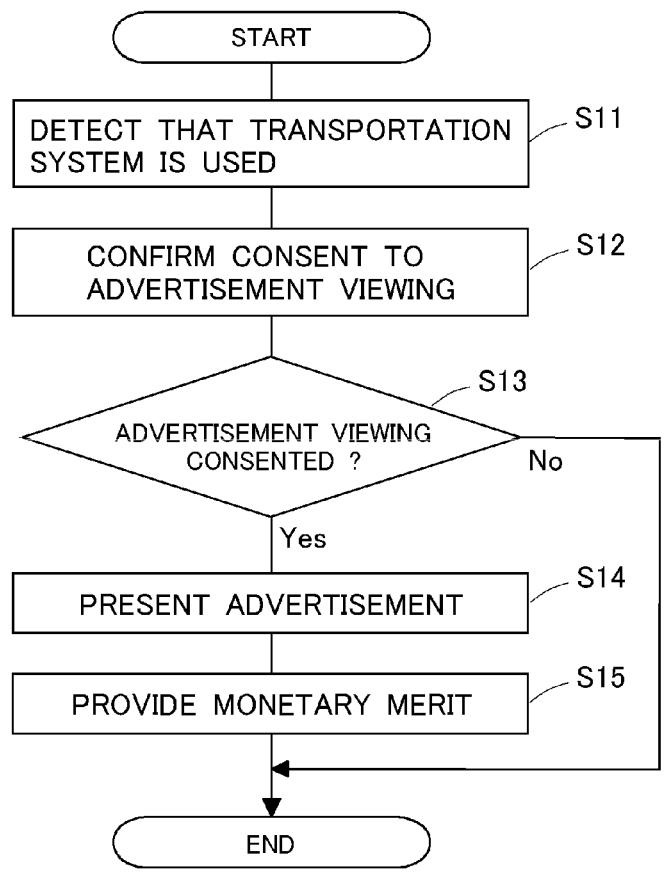

[Fig. 4]
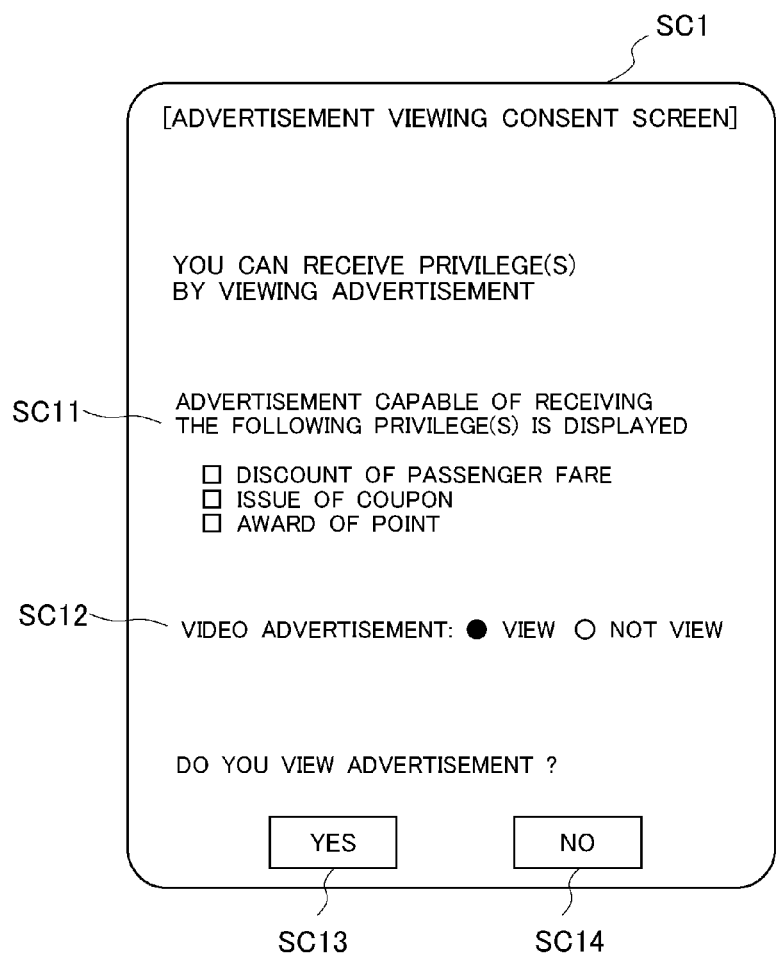

[FIG. 5]

| ADVERTISEMENT OBJECT | VIDEO ADVERTISEMENT | IMAGE ADVERTISEMENT | BOARDING FARE DISCOUNT | AWARD OF POINTS | ISSUANCE OF COUPONS |
|---|---|---|---|---|---|
| A RESTAURANT | VIDEO A | IMAGE A | PRESENT | ABSENT | PRESENT |
| B AQUARIUM | VIDEO B | IMAGE B | PRESENT | ABSENT | ABSENT |
| C ART MUSEUM | VIDEO C | IAMGE C | ABSENT | PRESENT | PRESENT |
| D CLINIC | VIDEO D | IAMGE D | PRESENT | ABSENT | ABSENT |
| E BOOK STORE | VIDEO E | IAMGE E | PRESENT | PRESENT | ABSENT |
| ... | ... | ... | ... | ... | ... | ns
INFORMATION PROCESSING APPARATUS, INFORMATION PROCESSING METHOD, AND NON-TRANSITORY STORAGE MEDIUM

CROSS-REFERENCE TO RELATED APPLICATIONS

This application claims the benefit of Japanese Patent Application No. 2018-174880, filed on Sep. 19, 2018, which is hereby incorporated by reference herein in its entirety.

BACKGROUND

Technical Field

The present disclosure relates to an information processing apparatus, an information processing method, and a non-transitory storage medium.

Description of the Related Art

There have been proposed a variety of techniques for distributing advertisements to passengers using public transportation.

For example, patent literature 1 discloses an advertisement distribution system which carries out advertisement distribution in an effective manner by identifying the use purpose of a passenger using public transportation based on information with respect to a boarding section obtained from the passenger thereby to narrow objects to be displayed. In the patent literature 1, there has been proposed the distribution of advertisements according to a customer classification of whether the passenger is "an ordinary passenger" or is "a temporary passenger".

CITATION LIST

Patent Literature

Patent Literature 1: Japanese patent application laid-open publication No. 2012-088871

SUMMARY

The present disclosure has for its object to clarify the merit of a user viewing an advertisement thereby to improve the viewer rating of the advertisement.

A first aspect of the present disclosure resides in an information processing apparatus. The information processing apparatus is provided with a controller including at least one processor. The controller is configured to execute:

obtaining a consent to advertisement viewing from a user using a transportation system;

presenting an advertisement within a period of time during which the user is using the transportation system; and providing a monetary merit to the user.

A second aspect of the present disclosure resides in an information processing method. The information processing method may be made to cause a computer to execute:

a step of obtaining a consent to advertisement viewing from a user using a transportation system;

a step of presenting an advertisement within a period of time during which the user is using the transportation system; and a step of providing a monetary merit to the user.

A third aspect of the present disclosure resides in an information processing program or a non-transitory storage medium stored with the information processing program. In such case, the information processing program may be configured to make to cause a computer to execute:

a step of obtaining a consent to advertisement viewing from a user using a transportation system;

a step of presenting an advertisement within a period of time during which the user is using the transportation system; and a step of providing a monetary merit to the user.

According to the present disclosure, it is possible to clarify the merit of a user viewing an advertisement thereby to improve the viewer rating of the advertisement.

BRIEF DESCRIPTION OF DRAWINGS

FIG. 1 is a view illustrating an example of the schematic configuration of an advertisement presentation system.

FIG. 2 is a view illustrating an example of the functional configuration of an information processing apparatus.

FIG. 3 is a flow chart illustrating an example of a flow of advertisement presentation processing.

FIG. 4 is a view illustrating an example of an advertisement viewing consent screen.

FIG. 5 is a view illustrating an example of an advertisement information table.

DESCRIPTION OF EMBODIMENTS

As means for advertisement to users of transportation systems, there are used advertisement hanging in a train, window above posters, in-vehicle visions, and transportation advertising (i.e., advertisings on vehicles), for example. In addition to these, it is also considered to distribute advertisements to portable terminals or personal digital assistants which are possessed by the users using transportation systems. Thus, advertisements are presented in a variety of ways or modes, and besides, there is proposed a technique of classifying the users viewing advertisements and changing the contents of advertisements to be presented. However, among the advertisements to be presented unilaterally to the users, those ones at which the users watch closely are limited, so there may occur a case where an improvement in viewer rating cannot be attained to a sufficient extent.

In consideration of the above-mentioned, in cases where a user using a transportation system gives a consent to view an advertisement, an information processing apparatus according to this embodiment provides a monetary merit to the user who has consented to view the advertisement. In this case, the user views the advertisement in return of receiving the monetary merit, instead of viewing an advertisement presented unilaterally, so the troublesomeness felt by the user presented with the advertisement is reduced. In addition, it is considered that the user views or watches the advertisement in return of receiving the monetary merit, more earnestly than the unilaterally presented advertisement. Accordingly, by clarifying to the user using the transportation system the monetary merit which the user will be able to receive, it becomes possible to improve the viewer rating of the advertisement.

As the monetary merit, there can be mentioned, for example, a discount in the fare of the transportation system, the award of points which are provided by an advertiser or a company managing the transportation system, and the issuance of coupons which can be used for the goods or services provided by the advertiser. Here, note that the cost required for providing the monetary merit may be paid by the advertiser, for example, according to the frequency of viewing the advertisement by the user.

Embodiment 1

(System Outline)

FIG. 1 is a view illustrating the schematic configuration of an advertisement presentation system according to this first embodiment. In the example of FIG. 1, the advertisement presentation system includes an information processing apparatus 1 and a user terminal 2 which is a terminal possessed by a user. The information processing apparatus 1 and the user terminal 2 are mutually connected to each other by a network N.

The information processing apparatus 1 obtains a consent to view an advertisement from a user using a transportation system. As the transportation system, there are mentioned, by way of example, public transportation facilities including an electric train, a bus, an airplane, a marine vessel, etc., and besides these, a vehicle called a ride share (riding together) vehicle for which the passenger or boarding fare is charged. The information processing apparatus 1 can confirm to the user whether the user consents to view an advertisement, and can obtain a consent to advertisement viewing, for example, through a predetermined application (hereinafter, also referred to as an app) installed in the user terminal 2.

The information processing apparatus 1 may obtain a consent to advertisement viewing through the user terminal 2 in advance before the user uses the transportation system. For example, the user can set, by means of the predetermined app of the user terminal 2, whether to consent to view an advertisement during riding on the transportation system.

The information processing apparatus 1 can confirm whether the user consents to view the advertisement, at the time when the user reserves or purchases a passenger ticket for the transportation system. In addition, in cases where the boarding fare for the transportation system is settled or paid by the user terminal 2, the information processing apparatus 1 may confirm whether the user consents to view the advertisement. For example, when the boarding fare is settled or paid by traffic system electronic money, upon the user getting on or off the transportation system or upon the user passing through a ticket gate, the information processing apparatus 1 needs only to make the user terminal 2 display a screen for confirming whether the user consents to view the advertisement.

Further, the information processing apparatus 1 may confirm whether the user consents to view the advertisement, by detecting that the user gets in the transportation system. For example, the user terminal 2, which has received an ultrasonic beacon sent into a vehicle of the transportation system, confirms to the user whether to consent to view the advertisement. By receiving from the user terminal 2 a notification of acceptance or rejection of the consent to advertisement viewing, the information processing apparatus 1 can detect the ride of the user, and confirm whether the user consents to view the advertisement.

The information processing apparatus 1 presents the advertisement to an advertisement viewing user who has consented to the viewing of the advertisement. The information processing apparatus 1 may distribute the advertisement to the user terminal 2 of the advertisement viewing user. In addition, the information processing apparatus 1 may display the advertisement on a display arranged in the surrounding of a doorway or a ticket examining machine, when the user gets on or off the transportation system, or when the user passes through a ticket gate.

The information processing apparatus 1 provides a monetary merit to the user who has viewed the advertisement. For example, the information processing apparatus 1 can discount the boarding fare to the user who has consented to view the advertisement in advance, at the time when the user settles or pays the boarding fare for the transportation system. In addition, the information processing apparatus 1 can discount the boarding fare by repaying a part thereof, in cases where a consent to advertisement viewing is obtained from the user after settlement or payment of the boarding fare. The monetary merit is not limited to the discount of the boarding fare, but may also include the award of various kinds of points, and the issuance of coupons which can be utilized in the facilities for the advertisement object.

The user terminal 2 confirms to the user whether to consent to the viewing of the advertisement, in response to a request from the information processing apparatus 1. The user can input the acceptance or rejection of the consent to advertisement viewing to the user terminal 2 through a predetermined app. The user terminal 2 notifies the acceptance or rejection of the consent to advertisement viewing thus inputted to the information processing apparatus 1. In addition, in cases where the user has consented to the viewing of the advertisement, the user terminal 2 displays the advertisement distributed from the information processing apparatus 1 on the display.

The network N is a public communication network on a worldwide scale such as, for example, the Internet, and WAN (Wide Area Network) or other communication networks may be adopted. In addition, the network N may also include a telephone communication network such as a cellular or mobile phone network or the like, a wireless communication network such as Wi-Fi or the like.

(Hardware Configuration)

The information processing apparatus 1 is composed of a computer, a workstation or the like. Such a computer has a processor 11 such as a CPU, a DSP or the like, a main storage unit 12 such as a read-only memory (ROM), a random-access memory (RAM) or the like, an auxiliary storage unit 13 such as an EPROM, a hard disk drive (HDD), a removable medium or the like, and a communication unit 14 for communicating with the user terminal 2 or other devices.

The removable medium is, for example, a flash memory such as a USB memory, an SD card or the like, or a disk storage medium such as a CD-ROM, a DVD disk, a Blu-ray Disc or the like. In the auxiliary storage unit 13, there are stored an operating system (OS), various kinds of programs, various kinds of tables, etc., and individual functional units configured to attain predetermined objects to be described later can be achieved by loading the programs stored thereto a working area of the main storage unit 12, executing them, and controlling individual component units or parts through the execution of the programs. However, a part or all of the functional units may be achieved by a hardware circuit(s) such as an ASIC, an FPGA, or the like. Here, note that the information processing apparatus 1 is not limited to the case where it is achieved by a single physical configuration, but may be composed of a plurality of computers which mutually cooperate with one another.

In addition, the communication unit 14 is capable of communicating with a reader for traffic system IC cards which is arranged in a doorway or a ticket gate of the transportation system, a device for controlling get-off notification buttons (alighting buttons) arranged in a bus, passenger ticket vending machines, etc. Moreover, the communication unit 14 can also communicate with a display for displaying the advertisement within the transportation system, a device for detecting the user getting on and off the transportation system, etc.

The user terminal 2 is used for the user to consent to advertisement viewing, and to view the advertisement distributed from the information processing apparatus 1. The user terminal 2 may not be limited to one, but a plurality of user terminals 2 may be connected to the information processing apparatus 1 through the network N, as illustrated in FIG. 1. Each user terminal 2 is, for example, a smart phone, a portable or cellular phone, a tablet terminal, a personal information terminal, a small-sized computer such as a wearable computer (smart watch, etc.), or the like.

Each user terminal 2 is a computer which has a processor 21, a main storage unit 22, an auxiliary storage unit 23, a communication unit 24, an input unit 25, and an output unit 26, and, typically, is a mobile computer such as a smart phone, a tablet type PC, or the like. The input unit 25 is a pointing device such as a touch pad, a mouse or a touch panel, a keyboard, a manual operation button, or the like, and accepts or receives an operational input such as the acceptance or rejection of the consent to advertisement viewing or the like, for example. The output unit 26 is, for example, a liquid crystal display (LCD), an organic EL (electroluminescence) display, or the like, and can display the advertisement distributed from the information processing apparatus 1.

(Functional Configuration)

FIG. 2 is a view illustrating an example of the functional configuration of the information processing apparatus 1. The information processing apparatus 1 achieves the functions illustrated in FIG. 2, by loading a program stored in the auxiliary storage unit 13 to the main storage unit 12 and executing it by means of the processor 11. That is, the information processing apparatus 1 functions as a consent confirmation unit 101, an advertisement presentation unit 102, a privilege providing unit 103, and an advertisement information database (DB) 111. The advertisement information database 111 is built by a database management system program which is executed by the processor 11 so as to manage the data stored in the auxiliary storage unit 13. The advertisement information database 111 is a relational database, for example. The details of these functional units will be explained below in detail with reference to the following flow chart. In addition, the processor 11 configured to execute the program thereby to achieve these functions corresponds to a "controller" in the present disclosure.

(Advertisement Presentation Processing)

FIG. 3 is a flow chart illustrating an example of a flow of advertisement presentation processing. Here, there is illustrated an example in which when a user gets in a transportation system, it is confirmed whether the user consents to the viewing of an advertisement, and after presenting the advertisement to the user, a monetary merit is provided to the user, but the present disclosure is not limited to this. The acceptance or rejection of the consent to advertisement viewing may be confirmed in advance, before the user uses the transportation system. For the term or condition "before the user uses the transportation system", there are mentioned, for example, a time when the user reserves a passenger ticket for using the transportation system, a time when the user settles or pays a boarding fare for using the transportation system, etc. In addition, provision of the monetary merit is not limited to after the advertisement has been presented to the user, but may be made before the presentation of the advertisement, as long as the user has consented to the viewing of the advertisement. The advertisement presentation processing illustrated in FIG. 3 is started, for example, by using, as an opportunity or a trigger, an event that the user gets in the transportation system.

In step S11, the consent confirmation unit 101 detects that the user has gotten in the transportation system, i.e., is using the transportation system. The consent confirmation unit 101 can detect this, for example, by a traffic system IC card registered in the user terminal 2 being put in touch with a reader in the transportation system, in cases where the user gets in the transportation system. The reader is a device which is arranged in a doorway or a ticket gate of the transportation system, and which stores a boarding section of the user in the IC card. The reader notifies information on the user and information on a riding (getting-on) position (riding station) and an alighting (getting-off) position (alighting station) to the information processing apparatus 1. The consent confirmation unit 101 of the information processing apparatus 1 can detect that the user has gotten in the transportation system, by receiving from the reader a notification that the IC card of the user has been put in touch with the reader.

Moreover, the consent confirmation unit 101 can also detect that the user is riding on the transportation system, i.e., is using the transportation system, by receiving a notification from the user terminal 2 which has received an ultrasonic beacon sent into a vehicle of the transportation system.

In step S12, the consent confirmation unit 101 confirms to the user whether to consent to the viewing of the advertisement. The consent confirmation unit 101 can confirm whether the user consents to the viewing of the advertisement, for example through the user terminal 2. That is, by receiving at the user terminal 2 the acceptance or rejection of the consent to advertisement viewing which has been confirmed to the user, the consent confirmation unit 101 can confirm whether the user consents to the viewing of the advertisement.

Here, note that the timing to confirm the consent of advertisement viewing is not limited to when it is detected that the user is using the transportation system. For example, in cases where the boarding fare of the transportation system is advance payment, the consent confirmation unit 101 may confirm the acceptance or rejection of the consent to advertisement viewing, at the time when the boarding fare is settled or paid at the time when the user gets in the transportation system.

In addition, the confirmation of the consent to advertisement viewing is not limited to being made through the user terminal 2. For example, in cases where the user purchases the passenger ticket of the transportation system, the consent confirmation unit 101 may input the information on the acceptance or rejection of the consent to advertisement viewing to a ticket machine or a ticket issuing terminal for the passenger ticket. The input of the information on the acceptance or rejection of the consent to the ticket machine or the ticket issuing terminal may be done by an operation of the user himself or herself, or may be done by an operation of an operator who takes charge of the sale of the passenger ticket. By receiving the acceptance or rejection of the user's consent to advertisement viewing from the ticket machine or the ticket issuing terminal, the consent confirmation unit 101 can confirm whether the user consents to the viewing of the advertisement.

The consent confirmation unit 101 may store the confirmation result of the received acceptance or rejection of the consent in the auxiliary storage unit 13, by correlating it with user's identification information. The user's identification information can be made to be an identification number of the user terminal 2, for example. With this, it becomes possible for each of the functional units of the information processing apparatus 1 to obtain the information on the acceptance or rejection of the consent to advertisement viewing from the auxiliary storage unit 13 by specifying the user's identification information. Here, an advertisement viewing consent screen for confirming the consent of advertisement viewing to the user will be explained according to FIG. 4.

FIG. 4 is a view illustrating an example of an advertisement viewing consent screen. The advertisement viewing consent screen SC1 is a screen which is provided by the predetermined app installed in the user terminal 2. In cases where the consent confirmation unit 101 confirms the consent of advertisement viewing to the user, e.g., in cases where the consent confirmation unit 101 detects in step S11 that the user is using the transportation system, the consent confirmation unit 101 makes a request for the confirmation of the consent of advertisement viewing to the user terminal 2. By the request from the consent confirmation unit 101, the user terminal 2 displays the advertisement viewing consent screen SC1 on its display (the output unit 26), and confirms the consent of advertisement viewing to the user. On the advertisement viewing consent screen SC1, there are shown a selection column or section SC11 for user's desiring privilege, a selection column or section SC12 for the acceptance or rejection of viewing video advertisement, a consent button SC13 attached with a label "Yes", and a non-consent button SC14 attached with a label "No".

The selection section SC11 for user's desiring privilege is for selecting a privilege desired by the user in return for viewing an advertisement (corresponding to a "monetary merit"). In cases where the user has consented to the viewing of the advertisement, the advertisement presentation unit 102 should just display on the user terminal 2 the advertisement providing the privilege selected in the selection section SC11 by the user.

The selection section SC12 for the acceptance or rejection of viewing video advertisement SC12 is for the user to select whether to view a video advertisement. The privilege providing unit 103 may provide more privileges to the user who views the video advertisement for which the viewing time of the user is longer than that for an image advertisement.

The selection section SC11 and the selection section SC12 are for specifying conditions to narrow down presentation contents of the advertisement with respect to the user. The conditions to narrow down the advertisement contents are not limited to the items of the monetary merit desired by the user (the selection section SC11) and the video viewing acceptance or rejection (the selection section SC12). The advertisement viewing consent screen SC1 may also include a column(s) or a section(s) for specifying narrowing conditions such as an attribute called the user's sex or age, the destination of the user, the kind of advertisement (e.g., restaurant, amusement park, etc.) which the user desires to view, and the like. The advertisement presentation unit 102 can present an advertisement to the user, by selecting an advertisement object which meets the narrowing conditions specified by the user on the advertisement viewing consent screen SC1.

The consent button SC13 is a button which is pressed down by the user in cases where the user consents to the viewing of the advertisement. In cases where the consent button SC13 is pressed down, the user terminal 2 notifies to the information processing apparatus 1 that the user has consented to the viewing of the advertisement. In contrast to this, the non-consent button SC14 is a button which is pressed down by the user in cases where the user does not consent to the viewing of the advertisement. In cases where the non-consent button SC14 is pressed down, the user terminal 2 notifies to the information processing apparatus 1 that the user has not consented to the viewing of the advertisement.

In step S13 in FIG. 3, the consent confirmation unit 101 determines whether the user has consented to the viewing of the advertisement. The consent confirmation unit 101 can determine, from the notification from the user terminal 2 in step S12, whether the user has consented to the viewing of the advertisement. In cases where the user has consented to the viewing of the advertisement (Yes in step S13), the processing or routine goes to step S14. On the other hand, in cases where the user has not consented to the viewing of the advertisement (No in step S13), the routine illustrated in FIG. 3 is ended.

In step S14, the advertisement presentation unit 102 presents the advertisement to the user. The advertisement presentation unit 102 can present the advertisement, for example, by distributing advertisement information to the user terminal 2 of the user who has consented to the viewing of the advertisement, and making it displayed on the display of the user terminal 2.

The advertisement presentation unit 102 can present the advertisement within a period of time in which the user is using the transportation system. The advertisement presentation unit 102 may present the advertisement, when it has confirmed whether the user consents to the viewing of the advertisement. In addition, the advertisement presentation unit 102 may detect at a predetermined timing that the user is using the transportation system, similar to the processing in step S11, and in cases where the user is riding in a vehicle of the transportation system, the advertisement presentation unit 102 may present the advertisement to the user. The predetermined timing may be a predetermined time interval, or may be a timing at which the transportation system is stopped at a station or a bus stop, for example.

The presentation content of the advertisement to the user can be obtained from the advertisement information database 111, for example. Here, note that the advertisement presentation unit 102 may obtain advertisement information containing the presentation content of the advertisement from an external server which provides the advertisement information, through the network N such as the Internet or the like.

Here, the advertisement information stored in the advertisement information database 111 will be explained according to FIG. 5. FIG. 5 is a view illustrating an example of an advertisement information table. The advertisement information table is a table for managing the advertisement information to be presented to users. The advertisement information table has fields of advertisement object, video advertisement, image advertisement, boarding fare discount, award of points, and issuance of coupons.

The advertisement object field stores restaurants facilities, amusement facilities, accommodation facilities, medical institutions, etc., which are the objects to be advertised (the advertisement objects). The video advertisement field stores advertisement information by the videos of advertisement objects. For example, a video advertisement may be made to be presented to the user who has selected to view the video advertisement in the selection section SC12 of the advertisement viewing consent screen SC1 illustrated in FIG. 4.

The image advertisement field stores advertisement information by the images of advertisement objects.

The boarding fare discount field stores the presence or absence of a discount service of boarding fares with respect to the viewing of the advertisement. The advertisement information table is not limited to including the boarding fare discount field which stores the presence or absence of the boarding fare discount service, but may also include a field which stores discount rates or discount amounts of boarding fares. Here, note that the advertisement information table illustrated in FIG. 5 illustrates an example in which the presence or absence of boarding fare discount is set for each advertisement object, but the boarding fare discount, the discount rate, and the discount amount of money may be set in common for the individual advertisement objects, instead of being set for each advertisement object. In addition, the discount rate or the discount amount of money may be set in such a manner that it becomes larger for a user who views the video advertisement than for a user who does not view the video advertisement.

The point award field stores the presence or absence of the award of points to the viewing of the advertisement. The points to be awarded may be provided for each advertisement object, or may be available commonly in a plurality of advertisement objects. The advertisement information table is not limited to including the point award field which stores the presence or absence of the award of points, but may also include a field which stores the number of points to be awarded. In addition, the number of points to be awarded may be set in such a manner that it becomes larger for a user who views the video advertisement than for a user who does not view the video advertisement.

The coupon issue field stores the presence or absence of the issuance of coupons to the viewing of the advertisement. The advertisement information table is not limited to including the coupon issuance field which stores the presence or absence of the issuance of coupons, but may also include a field which stores the number of coupons to be issued and the privilege content of the coupons.

The advertisement information table is not limited to including the field of the boarding fare discount, the award of points, and the issuance of coupons, but may also include a field which stores the contents of other privileges. In addition, the advertisement information table may also include a field which stores an attribute (age, sex or the like) of the user relevant to each advertisement object. For example, in cases where an attribute of the user is specified on the advertisement viewing consent screen SC1, the advertisement presentation unit 102 can present an advertisement to the user, by selecting an advertisement object which meets the specified attribute of the user. Here, note that the attribute of the user is not limited to the case where it is specified on the advertisement viewing consent screen SC1, but may be obtained from the user terminal 2. Moreover, the advertisement information table may also include a field which stores location information on each advertisement object. The advertisement presentation unit 102 may select, for example based on the location information, an advertisement object which exists in the surrounding f a destination of the user or a station at which the transportation system has stopped, and may present an advertisement to the user.

In step S15 in FIG. 3, the privilege providing unit 103 provides a monetary merit to the user. The monetary merit including the discount for boarding fare, the award of points, the issuance of coupons or the like should just be provided to the user after the user has consented to the viewing of the advertisement. The privilege providing unit 103 can provide the monetary merit to the user, for example, when the boarding fare for using the transportation system has been settled or paid, or when the advertisement has been viewed, or when the user gets on or off the transportation system.

For example, in cases where the monetary merit is the discount of the boarding fare, the privilege providing unit 103 should just settle an amount of money obtained by subtracting a discount amount of money from the boarding fare, at the time when the user having consented to the viewing of the advertisement pays the boarding fare of the transportation system. In addition, in cases where the boarding fare is settled before the user consents to the viewing of the advertisement, the privilege providing unit 103 may repay the discount amount of money to the user after the user's consent to advertisement viewing.

Advantages

According to the first embodiment, the information processing apparatus 1 confirms to the user using a transportation system whether the user consents to view an advertisement within a period of time during which the user is using the transportation system. The information processing apparatus 1 presents the advertisement to the user having consented to the viewing of the advertisement, and provides the user with a monetary merit in return for advertisement viewing. With this, the information processing apparatus 1 can clarify the merit for the user to view the advertisement, thereby making it possible to improve the viewer rating of the advertisement.

Embodiment 2

In the above-mentioned first embodiment, the information processing apparatus 1 presents an advertisement to the user terminal 2 of the user who has consented to advertisement viewing. On the other hand, in this second embodiment, the information processing apparatus 1 presents an advertisement to the user in a different mode from the first embodiment. Here, note that the device or structural configuration and the functional configuration of the information processing apparatus 1 in the second embodiment are the same as those in the first embodiment. Here, in the advertisement presentation processing illustrated in FIG. 3, different processings of the second embodiment from those of the first embodiment will be explained.

In the second embodiment, the advertisement presentation unit 102 presents an advertisement to a user by using as a trigger the opportunity that the user has pressed down a stop button for stopping a transportation system. The advertisement presentation unit 102 may distribute and display the information of the advertisement on a display arranged in the surrounding of the stop button, for example. In addition, the advertisement presentation unit 102 may send the information of the advertisement by voice or sound from a speaker arranged in the surrounding of the stop button. In this case, the voice or audio advertisement information may be made to be sent by a directional speaker toward the user who has pressed down the stop button. In the second embodiment, the user can view the advertisement without the need to take out the user terminal 2, and hence, the possibility for the advertisement to be viewed is improved.

Here, note that in cases where the stop button is pressed down in the second embodiment combined with the first embodiment, it is also possible to present an advertisement to a user terminal 2. In this case, for example, the advertisement presentation unit 102 should just detect the user terminal 2 to which short distance communication can be performed from the position of the stop button, determine whether the user for the user terminal 2 is the one who has consented to the viewing of the advertisement, and present the advertisement to the user terminal 2 of the advertisement viewing user. The information on whether the user for the user terminal 2 is the one who has consented to the viewing of the advertisement can be obtained by specifying identification information of the user from the information on the acceptance or rejection of the consent to advertisement viewing stored in the auxiliary storage unit 13, as explained in the processing of step S12.

First Modification of Embodiment 2

The above-mentioned second embodiment illustrates an example in which an advertisement is presented when a user has pressed down a stop button as an indication of his or her intention of alighting. In contrast to this, this first modification of the second embodiment illustrates an example in which an advertisement is presented at the time when a user having consented to the viewing of an advertisement gets off a transportation system or passes through a ticket gate which serves to confirm a passenger ticket for the transportation system.

The advertisement presentation unit 102 can, for example, determine whether the user passing through an exit has consented to the viewing of an advertisement, and present the advertisement on a display arranged in the vicinity of the exit, in cases where the user is the one who has consented to the viewing of the advertisement. The advertisement presentation unit 102 can determines the fact that the user has passed through the exit, for example, by communicating with a user terminal 2 which has received an ultrasonic beacon sent or transmitted in the vicinity of the exit.

In addition, when the passenger ticket (including the user terminal 2 with information on the passenger ticket registered therein) is read by a ticket examining machine, the advertisement presentation unit 102 may present an advertisement on a display arranged in the ticket examining machine or in the surrounding thereof, in cases where the user has consented to the viewing of the advertisement.

In the first modification, in cases where the user gets off a transportation system, the viewer rate of an advertisement can be improved by displaying the advertisement on a display arranged in a position easy to visually recognize.

Second Modification of Embodiment 2

A second modification of the second embodiment relates to the presentation of an advertisement in a transportation system of seat reservation. A seat reserved or purchased by a user is correlated with the user who has reserved or purchased the seat (corresponding to "the user who sits on the seat"). Information on the correlation or correspondence relation between the seat and the user having reserved or purchased the seat can be stored in the auxiliary storage unit 13, for example. By correlating the seat in the transportation system and the user sitting on the seat with each other, the advertisement presentation unit 102 can obtain the information on whether the user sitting on the seat has consented to the viewing of an advertisement. The advertisement presentation unit 102 can control, based on the information on whether the user sitting on the seat has consented to the viewing of the advertisement, the presentation content or presentation time of the advertisement presented at the seat.

Here, note that the information on whether the user has consented to the viewing of the advertisement may also include information for selecting the advertisement to be presented, e.g., information on a privilege(s) desired by the user, acceptance or rejection of video viewing, an attribute of the user, the kind of the advertisement desired by the user, a destination, etc.

In cases where the user sitting on the seat has consented to the viewing of the advertisement, the advertisement presentation unit 102 should just display the advertisement on a display corresponding to the seat. The display corresponding to the seat may be one which is arranged for each seat, and may be one which is shared by a plurality of passengers. In cases where the display is shared by a plurality of passengers, the advertisement presentation unit 102 can present the advertisement to an advertisement viewing user(s) limited by distributing sound or voice only to a seat(s) on which the user(s) having consented to the viewing of the advertisement sit/sits. In addition, the advertisement may be made to be presented, for a longer period of time, to the user(s) having consented to the viewing of the advertisement than to the user(s) having not consented to the viewing of the advertisement.

In the second modification, the advertisement presentation unit 102 can control the presentation content or presentation time of the advertisement for each seat, by correlating the seat and the user sitting on the seat.

OTHER EMBODIMENTS

The above-mentioned embodiments and modifications are only some examples, and the present disclosure can be implemented while being changed or modified suitably without departing from the spirit and scope of the present disclosure.

In addition, the configurations and processings explained in this disclosure can be implemented in various combinations thereof, as long as technical inconsistency does not occur.

Moreover, the processing(s) explained as carried out by a single device may be carried out by a plurality of devices. Alternatively, the processing(s) explained as carried out by different devices may be carried out by a single device. In a computer system, whether each function of the disclosure is achieved by what kind of hardware configuration (server configuration) can be changed in a flexible manner.

The present disclosure can also be achieved by supplying a computer program to a computer which implements the functions explained in the above-mentioned embodiments and modifications, and by reading out and executing the program by means of one or more processors of the computer. Such a computer program may be supplied to the computer by a non-transitory computer readable storage medium which can be connected with a system bus of the computer, or may be supplied to the computer through a network. The non-transitory computer readable storage medium, for example, an arbitrary type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, an arbitrary type of medium suitable for storing electronic commands.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. An information processing apparatus comprising:
a controller including at least one processor, the controller being configured to execute:
displaying an advertisement viewing consent display screen configured to receive inputs of an acceptance or rejection of a consent to view an advertisement on a ticket machine for a passenger ticket, upon a user purchasing the passenger ticket of a transportation system;
receiving the inputted acceptance of the consent of the user to view the advertisement from the ticket machine;
detecting a user terminal used by the user that accepts the consent to view the advertisement using a sensor of the transportation system that the user terminal is located in the transportation system; and
in response to the user terminal being detected within the transportation system, advertisement within a period of time during which the user is using the transportation system.

2. The information processing apparatus according to claim 1, wherein the controller presents the advertisement by distributing the advertisement to the user terminal of the user.

3. The information processing apparatus according to claim 1, wherein a presentation content of the advertisement is selected based on at least either of the monetary merit desired by the user, an attribute of the user, and location information on the transportation system.

4. The information processing apparatus according to claim 1, wherein
a seat in the transportation system is correlated with the user who sits on the seat; and
the controller controls, based on information on whether the user sitting on the seat has consented to viewing of the advertisement, a presentation content or presentation time of the advertisement at the seat.

5. An information processing method causing a computer to execute:
a step of displaying an advertisement viewing consent display screen configured to receive inputs of an acceptance or rejection of a consent to view an advertisement on a ticket machine for a passenger ticket, upon a user purchasing the passenger ticket of a transportation system;
a step of receiving the inputted acceptance of the consent of the user to view the advertisement from the ticket machine;
a step of detecting a user terminal used by the user that accepts the consent to view the advertisement using a sensor of the transportation system that the user terminal is located in the transportation system; and
a step of, in response to the user terminal being detected within the transportation system, presenting the advertisement within a period of time during which the user is using the transportation system.

6. A non-transitory computer-readable storage medium having stored therein an information processing program, the information processing program including instructions causing a computer to execute:
a step of displaying an advertisement viewing consent display screen configured to receive inputs of an acceptance or rejection of a consent to view an advertisement on a ticket machine for a passenger ticket, upon a user purchasing the passenger ticket of a transportation system;
a step of receiving the inputted acceptance of the consent of the user to view the advertisement from the ticket machine;
a step of detecting a user terminal of a user used by the user that accepts the consent to view the advertisement using a sensor of the transportation system that the user terminal is located in the transportation system; and
a step of, in response to the user terminal being detected within the presenting the advertisement within a period of time during which the user is using the transportation system.

* * * * *